United States Patent [19]

Leach

[11] Patent Number: 4,848,398
[45] Date of Patent: Jul. 18, 1989

[54] BALL GATE PRESSURE RELIEF VALVE

[75] Inventor: Allen A. Leach, Laffrey, N.H.

[73] Assignee: Jaffrey Fire Protection Co., Inc., Jaffrey, N.H.

[21] Appl. No.: 189,726

[22] Filed: May 3, 1988

Related U.S. Application Data

[63] Continuation-in-part of Ser. No. 940,861, Dec. 12, 1986, abandoned, which is a continuation of Ser. No. 797,704, Nov. 13, 1985, abandoned.

[51] Int. Cl.$^4$ .................... F16K 37/00; F16K 17/04
[52] U.S. Cl. ................................ 137/556.3; 137/550; 137/881; 251/249.5
[58] Field of Search ............. 137/882, 881, 878, 550, 137/556.6, 556.3; 251/249.5, 174

[56] References Cited

U.S. PATENT DOCUMENTS

| | | | |
|---|---|---|---|
| 3,064,938 | 11/1962 | Knox | 251/171 |
| 3,918,483 | 11/1975 | Van Leeuwen | 137/550 |
| 4,050,857 | 9/1977 | Leach | 137/115 |
| 4,076,211 | 2/1978 | Krechel et al. | 251/286 |
| 4,120,319 | 10/1978 | Krechel et al. | 137/583 |

Primary Examiner—A. Michael Chambers
Attorney, Agent, or Firm—Pearson & Pearson

[57] ABSTRACT

An intake relief valve is provided with a gate in the form of a ball cock which rotates in a horizontal plane on a vertical axis by means of a swivel pin and sector gear turned by a worm gear and wheel. The gear box housing is at the top of the valve and its exposed upper surface carries the markings "close", "$\frac{1}{4}$", "$\frac{1}{2}$", "$\frac{3}{4}$", and "open". The swivel pin carries a needle indicator, exterior of the gear box, to move from one marking to the other to show the degree of opening of the valve. The ball cock closes the valve ports, one of which is screened. It forms an annular compartment with the valve housing through which liquid may pass to the pressure relief valve in the lower portion of the valve whether the ball cock is in open or closed position.

12 Claims, 3 Drawing Sheets

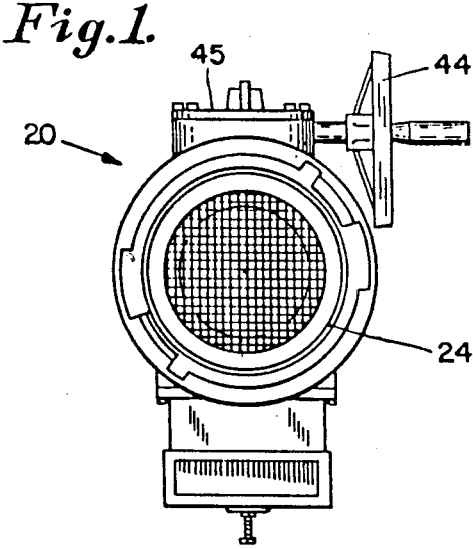
Fig.1.
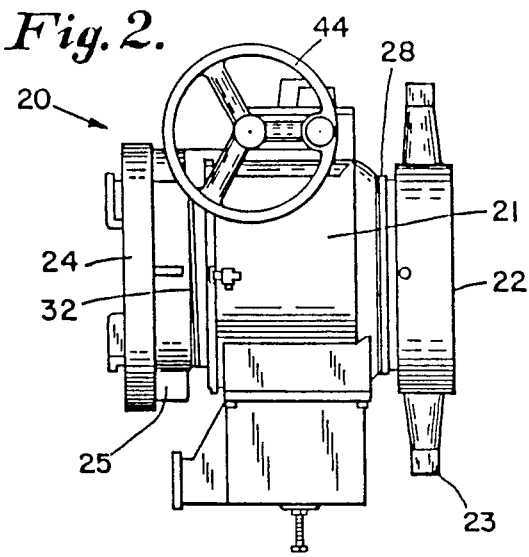
Fig.2.
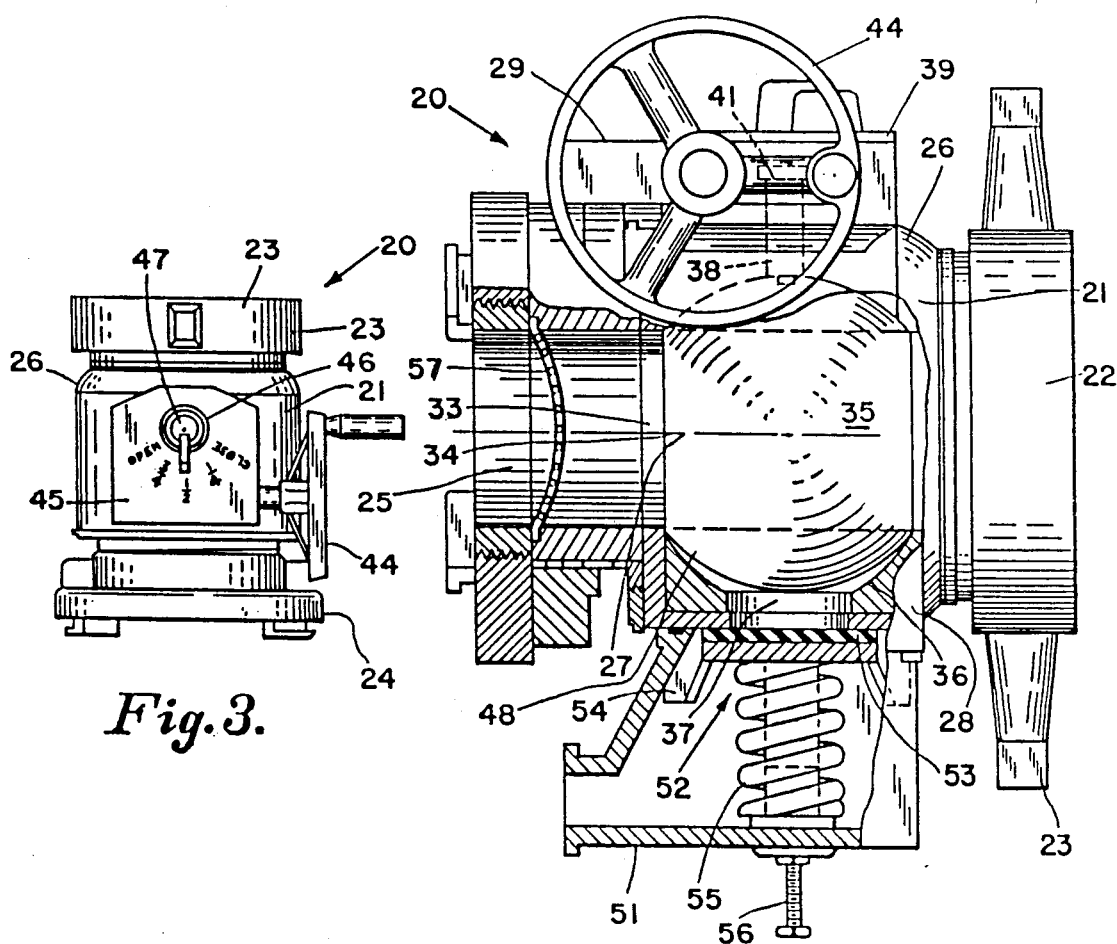
Fig.3.
Fig.4.

BALL GATE PRESSURE RELIEF VALVE

RELATED APPLICATIONS

This application is a continuation-in-part of my co-pending application Ser. No. 940,861 filed Dec. 12, 1986, now abandoned, which was a continuation of my application Ser. No. 797,704 filed Nov. 13, 1985 which is now abandoned.

BACKGROUND OF THE INVENTION

In the valve art it is known to provide a vertically slidable gate, operable by a turn wheel to open and close the flow passage and to provide a pressure relief valve on the suction side of the gate as in U.S. Pat. No. 4,050,857 to Paul A. Leach of Sept. 27, 1977.

There is also on the market a valve with a horizontally slidable piston advanced and retracted by a turn wheel to open and close the flow passage, the pressure relief valve being mounted on an elbow and operating whether the valve is open or closed. This valve is a product of Fire Products Division of Snap-Tite, Inc., Union City, Pa. 16438.

A valve having no pressure relief system but having a spherical hollow core cooperating with an annual, bevelled valve seat, the core turned by a turn wheel to open and close the valve flow passage, is disclosed in U.S. Pat. No. 2,690,894 to Blevans of Oct. 5, 1954.

SUMMARY OF THE INVENTION

Applicant's invention addresses the problem of providing reliable primary shut-off and relief valves for fire fighting equipment. In particular, it is known that turbulence of a fluid in a pipe causes a loss of energy in the fluid. In fire fighting applications, turbulence causes a pressure loss from the fluid source which is expressed as a loss in pressure head at the fire hose exit nozzle. Clearly, when the pressure at the nozzle has been lowered due to losses between the delivery (nozzle) and source (hydrant and fire pump) the water velocity and momentum, or what concerns us here, the distance it will travel upon leaving the nozzle, are reduced.

Such a reduction in the distance the fluid will flow upon leaving a nozzle has obvious implications. That is, the taller the building or the hotter the blaze, the more distance there is between the nozzle and first due to, of course, the required distance for the operator to hold the nozzle in relative safety The instant invention provides a novel combination primary shut-off valve and pressure relief valve in a single housing. In particular, the primary valve (a ball valve) is designed to provide non-turbulent flow through its connection with the primary source by providing a passage of identical diameter to the flow path. The pressure relief valve is then completely isolated from the primary flow path by way of a flow compartment provided between the ball valve and the pressure relief valve. Thus, there is no direct obstruction in the primary flow path due to the pressure relief valve as is caused when a relief valve is provided upstream or downstream of the primary valve. This is due to the pressure relief valve hole being indirectly connected to the primary flow path, rather than being provided directly in the primary flow path, as has been the usual practice.

In this invention, a spherical hollow core, or ball cock, is used as the valve gate, which cooperates with an annular, bevelled, valve seat, or insert. The ball cock is rotatable in a horizontal plane, on a vertical axis, within an enlarged valve chamber, on a lower trunnion and an upper swivel pin.

The upper swivel pin not only carries a gear sector, enmeshed with a worm gear on the shaft of a turn wheel, but also carries, exterior of the gear box, a needle which indicates the degree of opening of the valve. The lower trunnion is associated with an aperture leading downward to a spring pressed relief valve and outlet connected to the annular space around the ball cock.

An air bleeder valve is also directly connected to the annular chamber extending around the ball cock.

BRIEF DESCRIPTION OF THE DRAWINGS

FIG. 1 is a side elevational view of the valve of the invention;

FIG. 2 is a front elevational view of the valve shown in FIG. 1;

FIG. 3 is a top plan view of the valve shown in FIG. 1;

FIG. 4 is an enlarged, front, elevational view, similar to FIG. 2, with parts broken away;

DESCRIPTION OF THE PREFERRED EMBODIMENT

Figure 5:
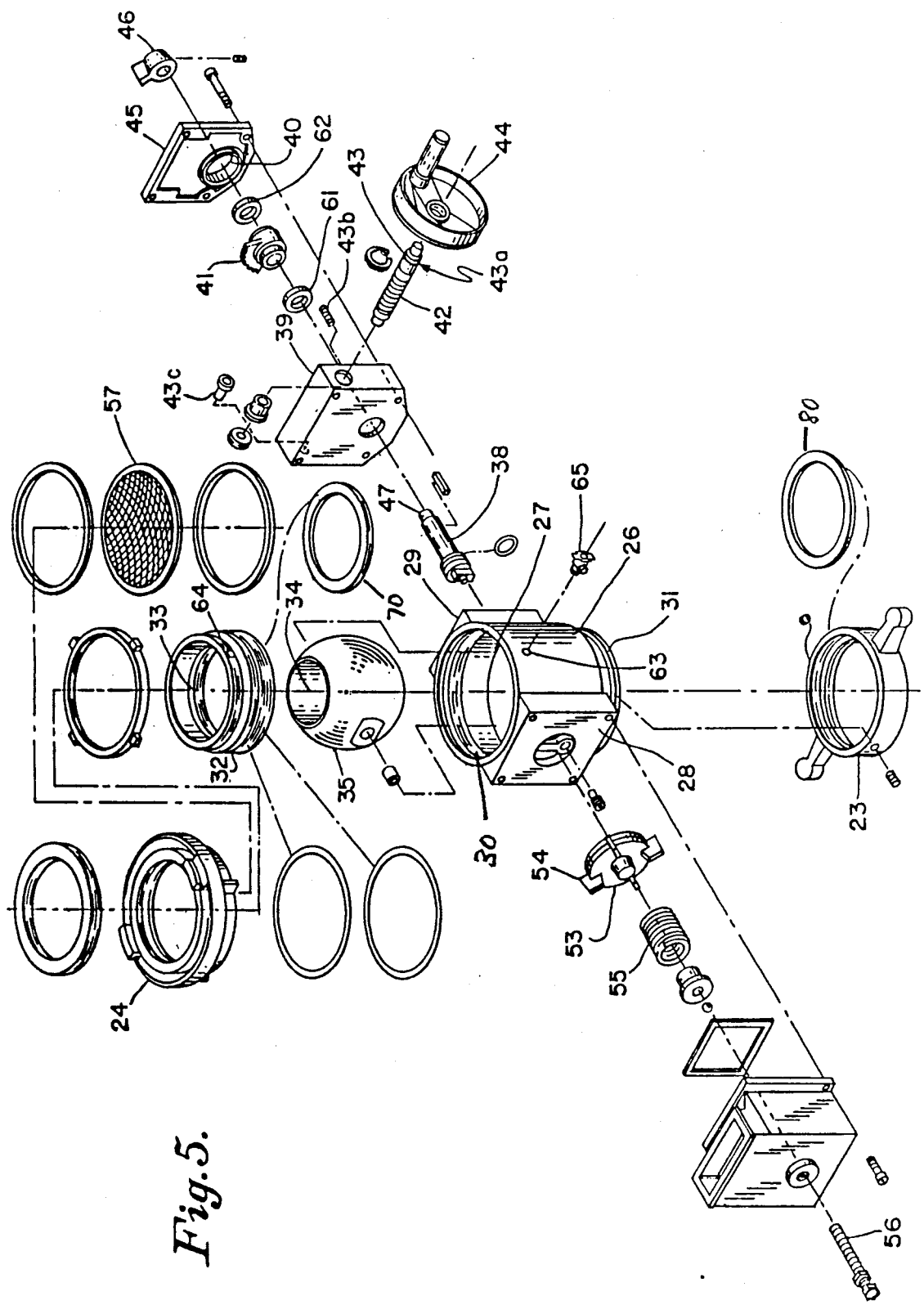
FIG. 5 is an exploded view to show the relationship of the parts of the valve.
Figure 6:
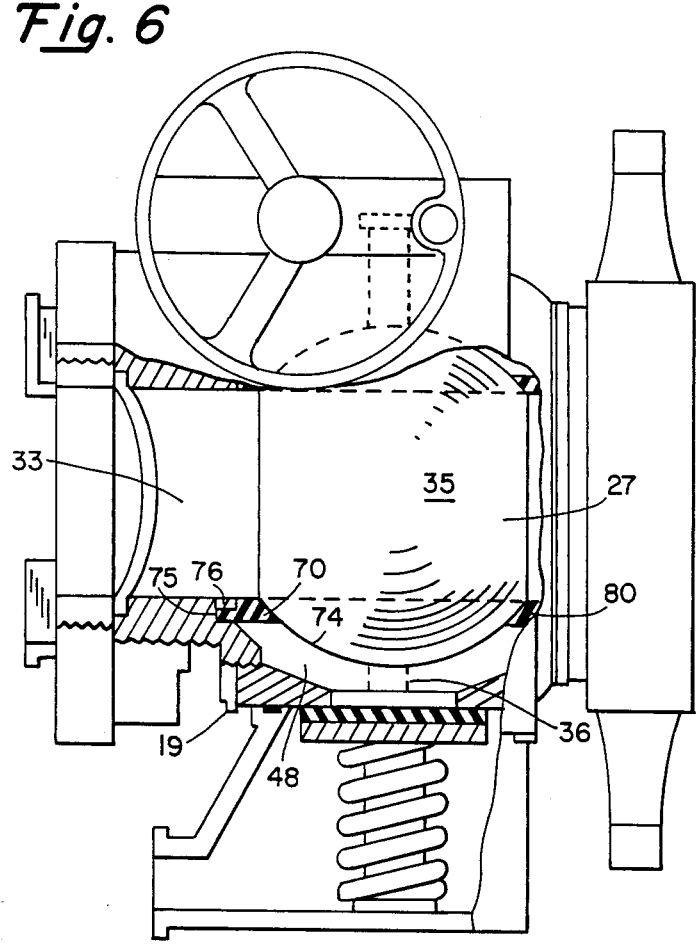
FIG. 6 is an enlarged, front elevational view, similar to FIG. 4 but with greater detail.
Figure 7:
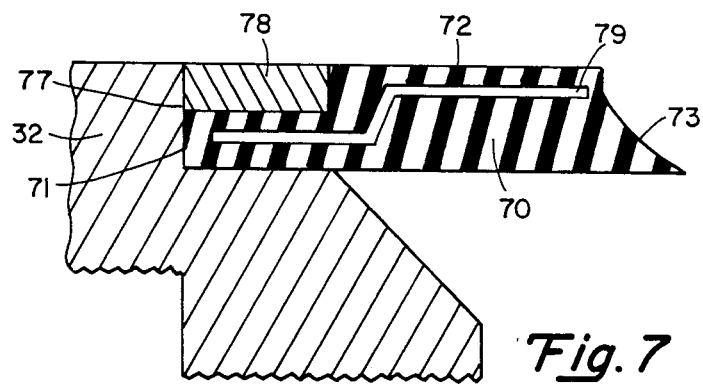
FIG. 7 is a detail view of the ball seal seat of FIG. 6.

As shown in the drawing the ball gate pressure relief valve 20 of the invention has a valve body 21 with an influent port 22 at the suction end which is equipped with a conventional quick attachment coupling 23 of the quarter turn type. A conventional hose coupling 24 is provided on the effluent port 25 at the other end of the valve body 21, for quick attachment of a conventional four or five inch diameter hose, when the valve 20 is attached to a motorized pumper of a vehicular fire engine.

The valve body 21 includes a main housing 26 containing a generally cylindrical and normally horizontal valve chamber 27, plus a cubical, lower, integral, portion 28, a cubical upper integral portion 29, an externally threaded, integral, suction end portion 31 threadedly receiving the quick attachment coupling 23, and an internally threaded integral opposite pressure end portion 30, threadedly receiving the generally cylindrical externally threaded ball seat insert 32, secured in place by lock washer 19.

The main housing 26 has an orifice 63, and the ball seat insert has an orifice 64 to receive the air bleeder valve 65.

Ball seal, or seat, insert 32 is hollow and cylindrical, and includes a flexible O-ring lip seal 70, adjacent pressure end 30 of valve body 21. The seal 70 is held in position by a press-fit into an annular groove 75 bored or cast integrally in insert 32 which forms an annular holding lip 76. Alternatively, insert 32 may include a counterbore 77 and a ring 78 may serve in place of the lip 76. In either embodiment, the insert 32 and seal 70 have an axial bore 33 of an inside diameter equal to the inside diameter of the axial bore 34 of the ball cock 35 so that, when the two bores are axially aligned, a smooth, non-turbulent flow passage is provided between influent port 22 and effluent port 25 through the valve 20.

Seal 70 includes a holding portion 71, raised inner diameter flow surface 72 and sealing surface 73 which may be shaped to conform to the spherical surface 74 of ball cock 35 adjacent to the seal 70. A similar seal 80 is held in position in a groove 81 (not shown) cast or bored in suction end 31 and is of the same description and construction as seal 70. Seals 70, 80 may be formed of any suitable elastomer, preferably of the polytetraflouroethylene (PTFE) encapsulated type, whereby the inner elastomer provides flexibility for press-fitting and sealing while the PTFE coating provides varying degrees of rigidity dependent on its thickness, as well as a smooth, low-friction surface upon which the ball cock 35 may slide freely, without "hang-up". Thus seals 70, 80 may be designed to open one-way at any desired pressure. The particular opening pressure being dependent upon the closing pressure they must withstand.

The ball cock 35 is generally spherical in exterior configuration and is supported for rotation in a horizontal plane, within valve chamber 27, on a vertical axis. The axis is formed at the bottom by a trunnion 36, having its upper end fixed in the ball cock and thence extending downwardly into the pressure relief hole 37 in the cubical portion 28, and into a trunnion not supported in the hole 37. The upper end of the vertical axis of the ball cock is formed by a swivel pin 38 which has its lower end fixed in the ball cock and thence extends upwardly through the upper, integral portion 29 and into a gear box 39, where it is affixed to a sector gear 41.

The sector gear 41 has a lower sector gear bearing double sealed ball bearing 61 on one side of the sector gear 41, and an upper sector gear bearing double sealed ball bearings 62 on the other side of the sector gear 41. The sector gear is enmeshed with the teeth of a worm gear 42 in the gear box 39, the shaft 43 of the worm gear has a worm gear retaining screw groove 43a, and a worm gear retaining screw 43b, as well as a worm gear and bushing 43c, all which cooperate to retain the worm gear in position. The shaft 43 extends out of the gear box 39 to a turn wheel handle 44, so that as the wheel 44 is turned the ball cock is turned from open to close position. The top wall 45 of the gear box bears the markings open, $\frac{3}{4}$, $\frac{1}{2}$, $\frac{1}{4}$, close and the swivel pin 38 extends out through a hole 40 in the top wall 45, with a needle 46 at the terminal end 47. Thus, there is visual indication of the degree of opening of the valve at all times.

The valve chamber 27 is of greater area than the exterior area of the ball cock so that a flow compartment 48 is formed around the ball cock bordered by chamber 27 and O-ring lip seals 70, 80 which connects the influent port 22 and the effluent port 25 or both, whenever the pressure in either port is greater than the pressure in compartment or relief passage 48, with the pressure relief hole 37 when the ball cock is holding the valve open or holding the valve closed. A pressure relief housing 51 is affixed to the integral lower portion 28 of the main housing 26, with pressure relief valve mechanism 52 therein consisting of a relief valve spider 53 normally covering the hole 37 and having integral wings such as 54 to guide it vertically within the relief housing, a helical spring 55 of predetermined strength, and an adjustment screw 56 for changing spring pressure of said valve.

During normal operation, fluid flow through port 22 will cause seal 70 to deflect to allow fluid flow into passage 48. Seal 70 will remain open until passage 48 reaches pressure equilibrium with port 22 at which time it will close due to the "memory" of the elastomer in seal 70. In the event of abnormal pressure or an overpressure, the pressure in passage 48 will exceed the setting of relief valve 52 causing it to open and allow flow therethrough. Seal 80 may operate in a similar manner. When the ball cock 35 is closed, only one port may be overpressured and only the corresponding seal would deflect allowing flow into passage 48. The other seal being forced into further sealing engagement with the ball cock surface 74 due to the shape of seal surface 73. This allows normal line pressure to remain in the unaffected port with fluid immediately available upon the opening of the valve.

Many variations of the invention are possible, for example, one of seals 70, 80 could be left uninstalled thereby allowing constant communication between one port and the relief valve. Also a metal reinforcing member 79 may be embedded in seals 70, 80 to insure closure during high pressure service.

A bowed, or concaved, screen 57 of stainless steel is mounted near the effluent port 25 with the arch, or curve, facing the oncoming liquid arriving from the intake, or influent port 22. Thus, any foreign material is prevented from entering the hose line and plugging it, or being delivered in the manner of a high speed projectile against the target of the hose.

I claim:
1. A relief valve comprising:
   a valve body having a generally cylindrical valve chamber with an influent port at one end and an effluent port at the other end constituting a primary flow path, said valve chamber having first and second ball seal seats mounted proximate said influent and effluent ports respectively an upper wall with a swivel pin hole therein, and a lower wall with a pressure relief hole therein;
   a ball rotatably mounted in said valve chamber and said ball having a swivel pin extending upwardly therefrom through said swivel pin hole and having a trunnion extending downwardly therefrom into said pressure relief hole, said ball including:
   a flow passage therethrough, said passage being rotatable with said ball and thereby continuously adjustable between an open or aligned position and a closed position whereby flow may be permitted or prevented through said primary flow path;
   said primary flow path defined by said ball seal seats including a flow passage of identical inside diameter to that of said ball passage and said ports such that, when said ball passage is in aligned position, flow occurs without turbulence;
   said ball being spherical with a diameter less than the diameter of said cylindrical valve chamber thereby forming a flow compartment therebetween, said compartment constituting a relief passage normally isolated from said primary flow path by all sealing means;
   said sealing means operable to allow communication from said primary flow path to said relief passage only when flow in said primary flow path is at a greater pressure than said relief passage;
   and a pressure relief valve housing mounted below said valve body, said housing including a spring pressed spider normally closing said pressure relief hole, said spider being displaceable from said hole at a predetermined pressure to relieve abnormal pressure in said primary flow path and thereby either of said ports whether said ball passage is in said open or closed position.

2. A relief valve as specified in claim 1 wherein:
a gear box housing is mounted on top of said valve body, said housing including a turn wheel, a worm gear within the housing having a retaining screw groove, a retaining screw and an end bushing, said worm gear being turned by said wheel and a sector gear having lower and upper sector double sealed ball bearings affixed to said swivel pin and turned by said worm gear.

3. A relief valve as specified in claim 2 wherein:
said swivel pin extends through the top of said gear box housing, a needle indicator is attached thereto to rotate in a horizontal plane and said gear box housing includes a top wall marked with indications, whereby the needle indicates how much said ball passage is "open" or "closed".

4. A relief valve as specified in claim 1 wherein:
said seal means may be comprised of one or more O-ring lip seals.

5. A relief valve as specified in claim 4 wherein:
said lip seal includes a holding portion positioned within an annular groove in said ball seal seat, said groove being concentric to said primary flow path.

6. A relief valve as specified in claim 5 wherein:
said lip seal further comprises a raised inner diameter flow surface of identical diameter to that of said primary flow path and a sealing surface adjacent and conforming to said ball.

7. A relief valve as specified in claim 6 wherein:
said lip seal flow surface and said sealing surface are operable to reflect in one direction only, thereby establishing said communication from said primary flow passage to said relief passage.

8. A relief valve as specified in claim 4 wherein:
said O-ring lip seal includes a metal reinforcing member therein.

9. A relief valve as specified in claim 5 wherein:
said annular groove is cast integrally in said ball seal seat and said lip seal holding portion is press-fitted therein.

10. A relief valve as specified in claim 5 wherein:
said annular grove comprises a counter gore in said ball seal seat and a ring of identical inner diameter to that of said ball seal seat flow passage thereby allowing said lip seal holding portions to be securely positioned therebetween.

11. A valve as specified in claim 4 wherein:
said lip seal is comprised of a polytetraflouroethylene encapsulated elastomer.

12. A valve as specified in claim 1 wherein:
said valve body includes a suction screen mounted between said ball seal seat and said effluent port.

* * * * *